UNITED STATES PATENT OFFICE.

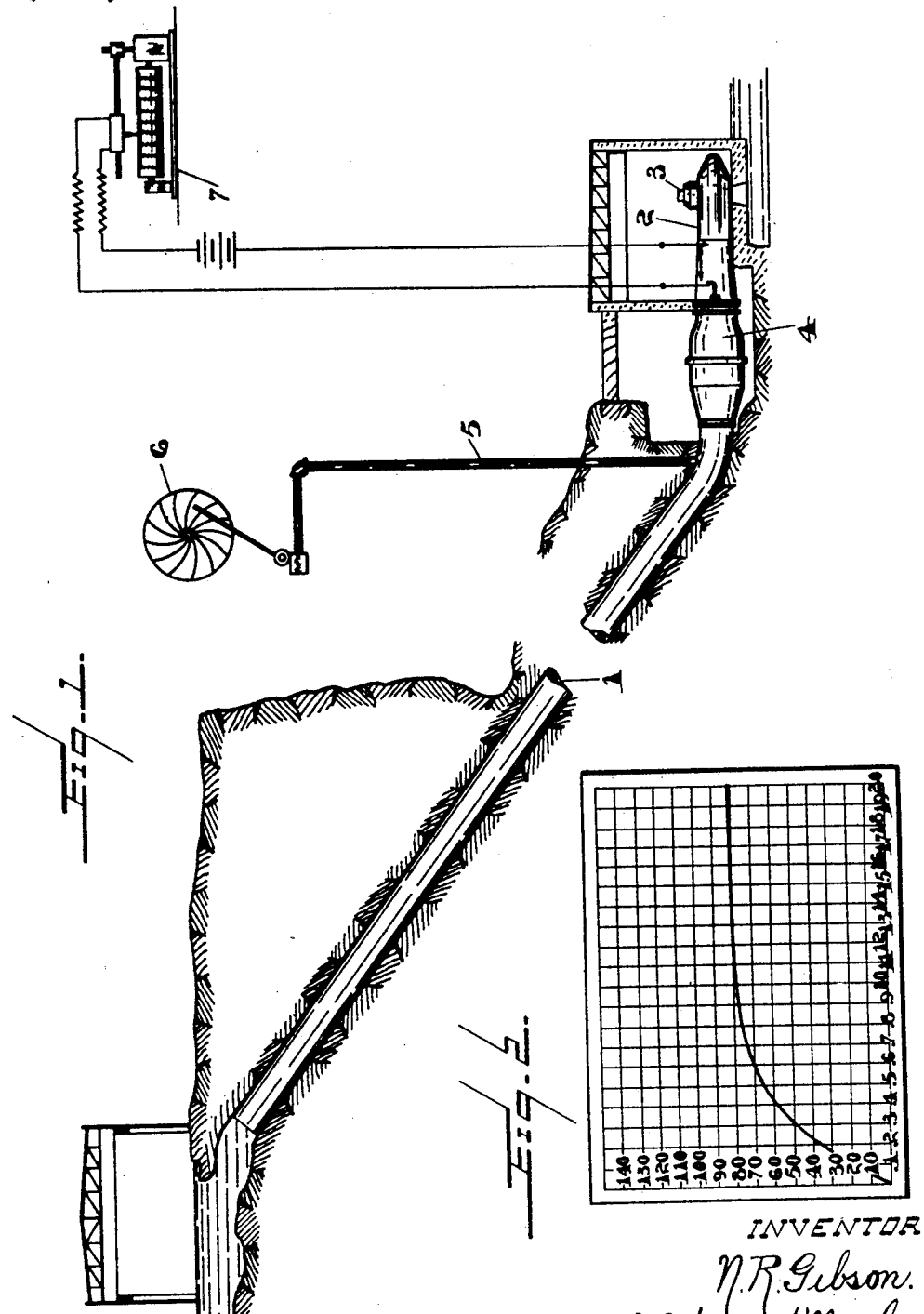

NORMAN R. GIBSON, OF NIAGARA FALLS, ONTARIO, CANADA.

MEASUREMENT OF THE FLOW OF FLUIDS IN CLOSED CONDUITS.

1,398,097.  Specification of Letters Patent.  Patented Nov. 22, 1921.

Application filed February 19, 1919. Serial No. 278,000.

*To all whom it may concern:*

Be it known that I, NORMAN R. GIBSON, a subject of the King of Great Britain, and resident of the city of Niagara Falls, in the county of Welland, Province of Ontario, Canada, have invented certain new and useful Improvements in the Measurement of the Flow of Fluids in Closed Conduits, of which the following is a specification.

There exists a demand for a simple and accurate method of determining the velocity of the flow of fluids in closed conduits involving the use of easily applied apparatus capable of giving fine readings with great accuracy.

This is particularly the case when the efficiency of water wheels in power plants is to be tested, as in such cases it is not desirable to employ any means which will interfere in any way with the commercial operation of the plant for any considerable period of time.

I have devised a method, and a suitable combination of means for obtaining the desired result which may be briefly described as follows:

Assuming for example, that the flow of water in a conduit pipe or penstock is to be measured to determine the efficiency of a water wheel supplied thereby, and that the water wheel is connected to an electric generator of known capacity, I proceed as follows. The length of the pipe line, and its cross sectional area are measured. If the pipe be made up of several lengths of different areas, the weighted mean area is to be used. Next, uniform conditions of speed, load etc. on the water wheel and generator are established and the power output of the generator measured in the ordinary manner. The flow in the conduit is now shut off close to the water wheel by means of a valve, or the ordinary turbine gates if the water wheel be of that type.

During the process of shutting off the flow, two sets of observations are made;

(*a*) The time taken to stop the flow in the conduit.

(*b*) The rise of pressure that takes place in the conduit at any point a known distance from the place where the flow is shut off. If a differential calculation is to be made the rise of pressure will be observed simultaneously at two such points in the conduit. A pressure time diagram is then plotted, the area below the plotted line then properly interpreted, and with certain corrections, represents the velocity of the fluid in the conduit before the flow was shut off. As friction losses in the pipe are recovered when the flow is shut off, a correction must be applied to allow for the loss of head when the fluid in the pipe is in motion and a further correction to allow for the velocity head. If the turbine gates or valve do not completely shut off the flow, a correction is to be made to allow for the quantity of leakage when the gates or valve are shut. As the influence of the elasticity of water and of the walls of the pipe seldom become appreciable in the average water-power plant, it is seldom, if ever, necessary to apply any correction on this account. Such corrections may be made however, by determining the head producing the flow and by observation of the periodicity of the pressure wave between the gates or valve and the origin of the pipe. The velocity of flow being known also the area of the conduit, the flow in the conduit is readily computed.

With this method of measurement I attain numerous advantages, among which may be mentioned the following—

1. Great accuracy in the determination, as in the observation of the pressure rise small changes in velocity result in comparatively large changes in the mean rise of pressure to be observed.

2. In most cases the rate of travel of the valve or turbine gates when shutting off the flow, or the ratio of the area of opening to the amount of travel do not require to be taken into account, but only the total time required to close the gate or valve.

3. The method is simple and inexpensive as special installments in the pipe line are not required.

4. The determination of the velocity of flow may be made quickly in one operation and tedious methods such as chemical gagings or pitot tube readings are avoided.

The equipment required for use in the process is shown in the drawings in which—

Figure 1 is a diagrammatic view of a conduit supplying a water wheel and shows the apparatus in position, and Fig. 2 a typical pressure-time diagram.

In the drawings like numerals of reference indicate corresponding parts in the different figures.

In Fig. 1, 1 is a closed conduit leading to a turbine water wheel 2 shown as directly connected to an electric generator shaft 3. 4 is a valve, by means of which the flow in the conduit may be shut off. 5 is a pipe connected to the conduit and leading to a recording pressure gage 6 of any ordinary type. 7 is an electric time recording device which may be, for example, a Marey chronograph. This may be electrically connected with the valve for automatic operation in any suitable manner.

While the apparatus is preferably of an automatic type, yet it will be understood that the observer may take pressure gage or manometer readings or observations of pressure rise by any other means at predetermined intervals during the time of closing the valve, and that the time taken in closing the valve may be in simple cases quite readily taken by an observer with a stop watch or chronograph.

To enable the process to be better understood I append a description of a typical determination resulting in the pressure-time diagram of Fig. 2.

*Example.*

In a hydroelectric power plant, assume a pipe of length, L equal 459.695 feet, having a mean cross-sectional area A equal 159.067 square feet.

Steady conditions of flow are established as already described and then the flow is stopped by means of a valve or the turbine gates.

Assume the time taken to close the gates is measured and found to be two seconds. During the closure the pressure in the pipe rises and the observations or graphic records of the pressure rise during the closure at the point where the flow is shut off are shown in the curve Fig. 2.

The area of this diagram below the curved line and above the base is then measured and found to be 34.235 square inches, and the mean rise of pressure is therefore, from the scale of the diagram 68.47 feet head of water, which will be designated P.

The mean rise of pressure thus obtained is composed of three parts.

(1) The mean pressure caused by the act of stopping the flow, which will be called $h$, and is equal to $\frac{LV}{gT}$ where L equals length of pipe,
V equals velocity of the water flowing in the pipe,
T equals time taken to stop the flow, and
$g$ equals gravitational unit, equals 32.2 ft. per sec. per sec.

(2) The mean recovery of velocity head as the flow of water is gradually stopped. The value of this item will be approximately $\frac{2}{3}\frac{V^2}{2g}$ but where additional refinement is desired it may be obtained by trial and error methods and more intricate calculations to determine the rate at which the velocity of flow is diminished. The error introduced by assuming this item equal to $\frac{2}{3}$ of the velocity head is usually extremely small.

(3) The mean recovery of friction head as the flow of the water is gradually stopped. The value of this item will also be approximately $\frac{2}{3}$ of the friction head $h_f$, but may be refined in the same manner as the velocity head.

In the example here worked out, the combined error in assuming the mean velocity head as $\frac{2}{3}\frac{V^2}{2g}$ and the mean friction head as two thirds of the total friction head amounts to only $\frac{1}{10}$ of one per cent.

The friction head $h_f$ may be obtained by measurement in any ordinary way without appreciable error and if desired may be represented as some coefficient "C" multiplied by $\frac{V^2}{2g}$, that is $h_f$ equals $C\frac{V^2}{2g}$. Generally its value will be determined directly in feet.

The value of V may now be found by the solution of the following quadratic equation:

$$P = \frac{LV}{gT} + \frac{2}{3}\frac{V^2}{2g} + \frac{2}{3}h_f$$

In this equation all the quantities except V and $V^2$ are known, P having been obtained from the diagram Fig. 2, L and $h_f$ having been measured and T having been observed, In our example,
P equals 68.47 feet.
L equals 459.695 feet.
T equals 2 seconds.
$g$ equals 32.2 ft. per sec. per sec.
$h_f$ equals 0.5 feet (assumed).

Inserting these values in the equation—

68.47 equals $\frac{459.695 \times V}{32.2 \times 2}$ plus $\frac{2}{3}\frac{V^2}{64.4}$ plus $\frac{2}{3} \times 0.5$.

Simplifying—

68.47 equals 7.138V plus 0.01035$V^2$ plus 0.33 and 0.01035$V^2$ plus 7.138V minus 68.14 equals 0.

Therefore $$V \text{ equals} \frac{-7.138V \pm \sqrt{(7.138)^2 - 4 \times 0.01035 \times (-68.14)}}{2 \times 0.01035}$$

and V equals 9.42 feet per second.

The quantity of water flowing is therefore

VA equals 9.42×159.067 equals 1498.51 cubic feet per second.

When the pipe is very long, the time of closing very short, or the gross head either very high or very low it is necessary to interpret the pressure time diagram somewhat differently by taking into account the elasticity of water and of the walls of the pipe, but in most cases this is not necessary.

What I claim as my invention is:—

1. In a process of measuring the velocity of flow of fluids in closed conduits, the steps which consists in interrupting the flow of fluid in the conduit and producing a diagram forming a record with respect to time of the changes of pressure that take place in the conduit during the interruption of the flow.

2. In a process of measuring the velocity of flow of fluids in closed conduits, the steps which consists in interrupting the flow of fluid in the conduit and producing diagrams forming records with respect to time of the changes of pressure that take place in the conduit during the interruption of the flow at two different points in the length of the conduit.

Dated at Niagara Falls, New York, this eleventh day of February, 1919.

NORMAN R. GIBSON.

Witnessed by—
  PAUL F. KRUSE,
  E. E. MANSFIELD.